United States Patent

[11] 3,617,655

[72] Inventor Russell C. Fischer
Wheaton, Ill.
[21] Appl. No. 42,370
[22] Filed June 1, 1970
[45] Patented Nov. 2, 1971
[73] Assignee GTE Automatic Electric Laboratories Incorporated
Northlake, Ill.

[54] DISABLING CIRCUIT OF A TRANSMISSION LINE AMPLIFIER
2 Claims, 2 Drawing Figs.

[52] U.S. Cl. .......... 179/170.4, 179/170 D
[51] Int. Cl. .......... H04b 3/44
[50] Field of Search .......... 179/170 D, 170.4

[56] References Cited

UNITED STATES PATENTS 3,483,336 12/1969 Lent .......... 179/170.4

*Primary Examiner*—Kathleen H. Claffy
*Assistant Examiner*—William A. Helvestine
*Attorneys*—Cyril A. Krenzer, K. Mullerheim, B. E. Franz and Glenn H. Antrim

ABSTRACT: In a two-way transmission system where a two-wire transmission line divides into an alternating current path and a direct current path, as in a repeater, a disabling circuit responds to cessation of current flow in the direct current path to disable the alternating current path. The disabling is required to prevent self-oscillation resulting from mismatch of impedance in hybrid circuits when the line is not in use. The input circuit of the disabling circuit includes a varistor connected in parallel with the series resistor to limit voltage drop used for sensing. The control switch that is connected to this sensing circuit comprises a pair of complementary transistors, a different one being conductive for each direction of current flow in the direct current path.

PATENTED NOV 2 1971 3,617,655

INVENTOR
RUSSELL C. FISCHER
BY Glenn H. Antrim
ATTORNEY

DISABLING CIRCUIT OF A TRANSMISSION LINE AMPLIFIER

BACKGROUND OF THE INVENTION

1. Field of the invention

In long telecommunication lines, repeaters of the type having a pair of hybrid transformers are commonly used to amplify alternating current signals. A line extending in one direction is connected to a pair of terminals of one hybrid transformer, and likewise a line extending in an opposite direction is connected to a pair of terminals of the other hybrid transformer. The impedance of each hybrid circuit is matched to the impedance of its line while the line is busy, but when the lines are not busy, mismatch occurs because line impedance is much higher. While the line is idle and the impedance is high, the amplifiers of the repeater may break into sustained oscillation. When an amplifier circuit connected to an idle line is oscillating, interference is induced through capacitance to other adjacent lines of a cable that contains them.

2. Description of the prior art

A disabling circuit for preventing oscillation on an idle line is described in U.S. Pat. No. 3,483,336 issued to W. C. Lent on Dec. 9, 1969. The circuit is applicable to repeaters in which the two-way, two-conductor transmission line divides into a direct current path and an alternating current path. Current flow is sensed in the direct current path, and in response to cessation of current, a transistor disabling switch is operated to disable the alternating current path in at least one direction of transmission. Through the use of a control oscillator between the input sensing circuits connected to the direct current path and the disabling switch connected to the alternating current path, coupling between the paths through the disabling circuit is negligible.

In this prior circuit, a resistor is connected in series in the direct current path to develop control voltage for application to the input of the disabling circuit. When this voltage is present, a transistor control switch is biased to a conductive state to short-circuit and thereby to disable the control oscillator. Since the current flow in the direct current path may be reversed at times, a full-wave diode rectifier is connected between the series resistor and the transistor control switch so that the transistor is biased for conduction regardless of the direction of current flow.

In order to have minimum losses in the direct current path, the voltage drop across the series resistor is no greater than necessary. The voltage drop is divided between the full-wave diode bridge and the input base circuit of the transistor switch. Diodes in the bridge and the transistor connected to the bridge are the germanium types that require a minimum voltage across them to sustain current. Although the germanium types performed well in the disabling circuit over a wide usable range of temperatures, the circuit failed in test at 140° F., which was the designated upper limit of ambient temperatures of a specification, in that it disabled the alternating current path at all times regardless of whether current was flowing in the direct current path.

In long transmission lines, the series resistors in the required number of repeaters may alter characteristics of the direct current path too much to provide desired operation. Where the line current is high, the values of the resistors that are chosen to provide necessary voltage over wide ranges of current could be decreased in value to decrease loss.

SUMMARY OF THE INVENTION

In the present circuit, the diode bridge has been eliminated so that all of the voltage developed across the series resistor is applied to the control circuit of the transistor switch that controls the oscillator. The present switch uses a pair of complementary types of silicon transistors, a different one being conductive for each direction of current flow in the direct current path. Although the silicon transistors require higher control voltage than that required by germanium transistors, the value of the series resistor can be about the same as it was in the prior circuit because of the elimination of the diode bridge. After eliminating the germanium diode bridge and substituting silicon transistors for the germanium transistor, the disabling circuit functioned properly at the upper specified ambient temperature of 140° F.

Undesirable alteration of characteristics of long direct current lines has been decreased by adding a varistor in parallel with the series resistor in each repeater. At those repeaters where the flow of direct current, or pulses of direct current, exceeds that required to develop the necessary amount of control voltage across the series resistor, the varistor decreases in resistance to maintain the voltage drop thereacross almost constant.

DESCRIPTION OF THE PREFERRED EMBODIMENT

Figure 1:
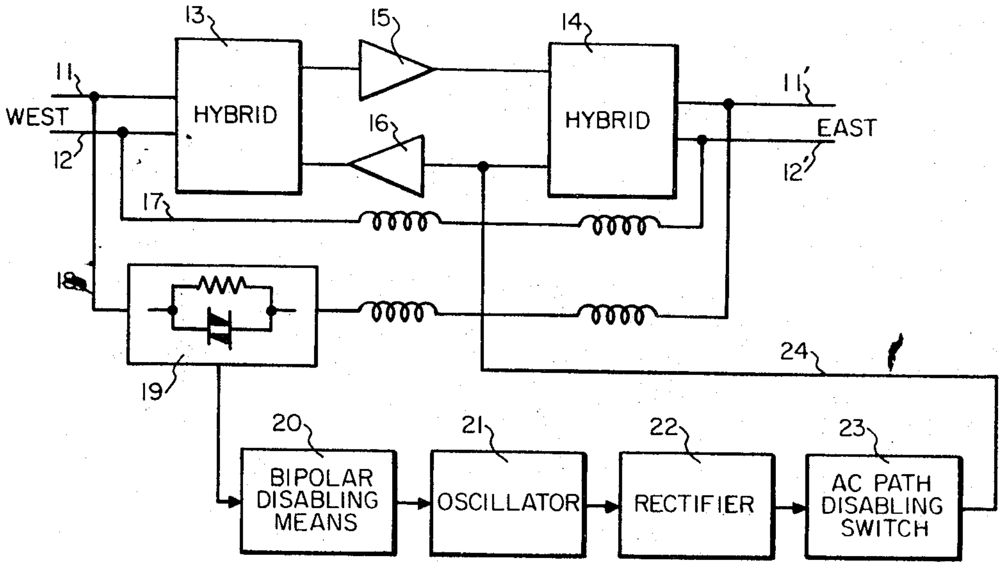
FIG. 1 is a block diagram of a repeater and its disabling circuit.

In FIG. 1, a disabling circuit is shown connected to a conventional hybrid repeater. Line terminals of a hybrid transformer 13 are connected to conductors 11 and 12 of a WEST line and the line terminals of a hybrid transformer 14 are connected to conductors 11′ and 12′ of an EAST transmission line. The alternating current from west to east is amplified by the amplifier 15, and the alternating current from east to west is amplified by the amplifier 16. A bypass, direct current line having conductors 17 and 18 and usual retardation or choke coils is connected between the WEST line and the EAST line. The conductor 18 has series resistive elements 19 that provide control voltage for operating the disabling circuit.

The series resistive elements 19 are connected to the input of a bipolar disabling means 20, and as described in U.S. Pat. No. 3,483,336 cited above, the output of the disabling means is connected to a control circuit of an oscillator 21. Normally, when the flow of direct current in the line conductor 18 is absent, the oscillator 21 provides an alternating current signal to a succeeding rectifier 22. When the transmission line is in use and direct current is present on the conductor 18, the bipolar disabling means 20 becomes conductive and short-circuits a control winding of the oscillator 21 to stop its oscillation.

The output of the rectifier 22 is connected to a control circuit of an alternating-current-path disabling switch 23, and the output of the switch is connected through a conductor 24 to the input of the east-to-west amplifier 16. When the transmission line is not in use, the oscillator 21 is in operation and rectified output from the rectifier 22 causes the disabling switch 23 to be conductive. While the switch 23 is conductive, the input of the amplifier 16 is short-circuited to prevent interchange of signals between the amplifiers 15 and 16 while the transmission line is idle. When the transmission line is busy and direct current is flowing in the conductor 18 of the direct current path, the oscillator 21 is short-circuited, and the disabling switch 23 is nonconductive so that a short circuit is not applied to the input of the amplifier 16.

Figure 2:
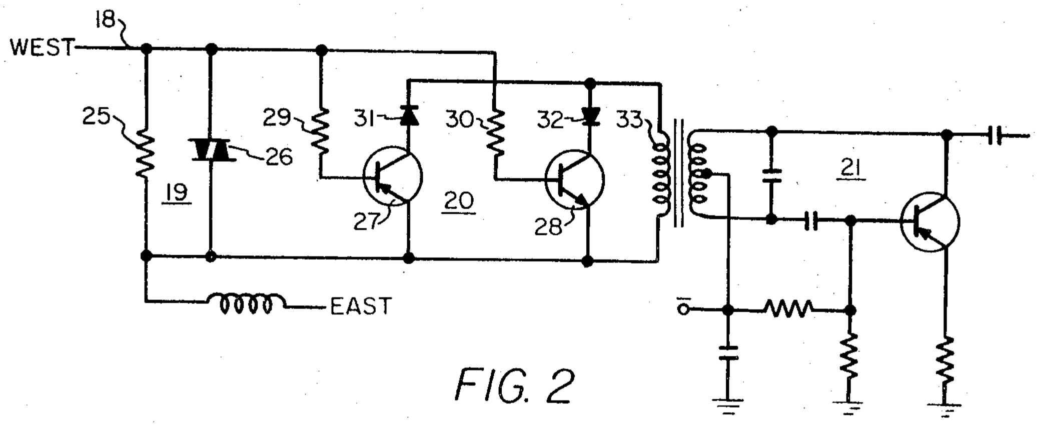
FIG. 2 is a schematic diagram of the input circuits of the disabling circuit of FIG. 1.

As shown in FIG. 2, a varistor 26 is connected in parallel with the series resistor 25, and the parallel combination is connected in the conductor 18 of the direct current bypass path. One side of the resistive combination is connected through respective current-limiting resistors 29 and 30 to the base of the type PNP transistor 27 and to the base of the type NPN transistor 28, and the other side is connected to the emitters of these transistors. The collectors of the transistors 27 and 28 are connected through respective diodes 31 and 32 to a terminal of a winding 33 on the transformer of the oscillator 21, and the emitters of the transistors 27 and 28 are connected to another terminal of the winding 33. When direct current is flowing in the line 18, one of the transistors dependent upon the direction of flow of current is conductive and decreases the impedance of the oscillator transformer sufficiently to prevent oscillation. When the transmission line is idle and current is not flowing in the conductor 18, current in the base circuits is absent, and the transistors tend to be nonconductive. To prevent conduction as a result of voltage from the oscillator being applied to the collector circuits, diodes 31 and 32 are connected in the required senses in the collector circuits.

I claim:

1. A disabling circuit of a two-way transmission system that has a direct current path and an alternating current path, said disabling circuit having resistive means connected in series in said direct current path, a control switch connected to said resistive means, a disabling switch connected to said alternating current path, and control means having a pair of input terminals connected to said control switch and an output connected to said disabling switch, said control switch operating to a conductive state in response to current flow in said direct current path; said control means operating in response to operation of said control switch to operate said disabling switch to its state for enabling said alternating current path, and said control switch operating in response to cessation of current flow in said direct current path to operate said disabling switch to its state for disabling said alternating current path, characterized in that said control switch comprises a pair of complementary transistors, each of said transistors having a base, an emitter, and a collector, means for connecting base circuits of said transistors to said resistive means, and the emitter-collector circuits of said transistors being connected in parallel across said pair of input terminals of said control means, a different one of said emitter-collector circuits being conductive for each direction of flow of current in said direct current path.

2. A disabling circuit according to claim 1 in which said resistive means includes a resistor and a varistor connected in parallel, said varistor limiting the voltage drop across said resistive means in said direct current path as the current flow therein exceeds a predetermined value.

* * * * *